(12) United States Patent
Kraft et al.

(10) Patent No.: US 11,705,708 B2
(45) Date of Patent: Jul. 18, 2023

(54) LAMINATED BUSBAR AND ARRANGEMENT COMPRISING LAMINATED BUSBARS

(71) Applicant: ABB Schweiz AG, Baden (CH)

(72) Inventors: Klaus Kraft, Heidelberg (DE); Rudi Velthuis, Lauchringen (DE); Arthouros Iordanidis, Baden (CH); Maciej Mruczek, Cracow (PL)

(73) Assignee: ABB Schweiz AG, Baden (CH)

( * ) Notice: Subject to any disclaimer, the term of this patent is extended or adjusted under 35 U.S.C. 154(b) by 39 days.

(21) Appl. No.: 17/072,055

(22) Filed: Oct. 16, 2020

(65) Prior Publication Data
US 2021/0036498 A1 Feb. 4, 2021

Related U.S. Application Data

(63) Continuation of application No. PCT/EP2018/059766, filed on Apr. 17, 2018.

(51) Int. Cl.
| | | |
|---|---|---|
| *H02B 1/01* | (2006.01) | |
| *H02B 1/21* | (2006.01) | |
| *H02G 5/00* | (2006.01) | |
| *H02G 5/02* | (2006.01) | |
| *H02G 5/04* | (2006.01) | |

(52) U.S. Cl.
CPC ............. *H02G 5/005* (2013.01); *H02B 1/013* (2013.01); *H02B 1/21* (2013.01); *H02G 5/025* (2013.01)

(58) Field of Classification Search
CPC . H02B 1/013; H02B 1/21; H02B 1/01; H02G 5/005; H02G 5/025; H02G 5/00; H02G 5/02; H02G 5/007; H02G 5/06; H02G 5/04; H01R 25/162
USPC ............................................. 174/68.2
See application file for complete search history.

(56) References Cited

U.S. PATENT DOCUMENTS

| | | | | |
|---|---|---|---|---|
| 3,104,276 A | * | 9/1963 | Cataldo | H02G 5/007 174/88 B |
| 5,905,631 A | * | 5/1999 | Winkler | H02B 1/36 361/601 |
| 2012/0314340 A1 | * | 12/2012 | Faber | H01R 13/04 361/611 |

(Continued)

FOREIGN PATENT DOCUMENTS

| | | |
|---|---|---|
| CN | 101068074 A | 11/2007 |
| CN | 102549864 A | 7/2012 |

(Continued)

OTHER PUBLICATIONS

Power Distribution_pp. 197-305_ Feb. 2018.*

(Continued)

*Primary Examiner* — Timothy J Thompson
*Assistant Examiner* — Guillermo J Egoavil
(74) *Attorney, Agent, or Firm* — Leydig, Voit & Mayer, Ltd.

(57) ABSTRACT

A laminated busbar includes: a base body comprising conducting layers and insulating material to electrically insulate the conducting layers from each other. The conducting layers and the insulating material are clamped together by mechanical means and/or a profile is connected to the base body. In an embodiment, no glue or adhesive is arranged between at least one conducting layer and at least one insulating material.

15 Claims, 7 Drawing Sheets

(56) References Cited

U.S. PATENT DOCUMENTS

2016/0344116 A1* 11/2016 Schmit .................. B60L 50/00

FOREIGN PATENT DOCUMENTS

| | | | | | |
|---|---|---|---|---|---|
| CN | 202696091 | U | * | 1/2013 | .............. H02G 5/02 |
| CN | 203787905 | U | * | 8/2014 | .............. H02B 1/20 |
| CN | 203787905 | U | | 8/2014 | |
| CN | 204315919 | U | * | 5/2015 | .............. H02B 1/01 |
| CN | 107364456 | A | | 11/2017 | |
| CN | 107769132 | A | * | 3/2018 | .............. H02G 5/00 |
| EP | 1710884 | A1 | | 10/2006 | |
| FR | 1255981 | A | | 3/1961 | |
| JP | 2009060757 | A | * | 3/2009 | .............. H02G 5/005 |
| KR | 20090056029 | A | * | 6/2009 | .............. H02G 5/005 |
| WO | WO-2013166562 | A1 | * | 11/2013 | .............. H02G 5/005 |
| WO | WO 2013166562 | A1 | | 11/2013 | |

OTHER PUBLICATIONS

European Patent Office, International Preliminary Report on Patentability in International Patent Application No. PCT/EP2018/059766, 9 pp. (dated Oct. 20, 2020).

European Patent Office, International Search Report in International Patent Application No. PCT/EP2018/059766, 5 pp. (dated Feb. 14, 2019).

European Patent Office, Written Opinion in International Patent Application No. PCT/EP2018/059766, 8 pp. (dated Feb. 14, 2019).

Chinese National Intellectual Property Administration, Search Report in Chinese Patent Application No. 201880092470.1, 3 pp. (undated).

* cited by examiner

LAMINATED BUSBAR AND ARRANGEMENT COMPRISING LAMINATED BUSBARS

CROSS-REFERENCE TO PRIOR APPLICATION

This application is a continuation of International Patent Application No. PCT/EP2018/059766, filed on Apr. 17, 2018, the entire disclosure of which is hereby incorporated by reference herein.

FIELD

The invention is related to a laminated busbar, comprising a base body comprising conducting layers and insulating material to electrically insulate the conducting layers from each other.

BACKGROUND

Laminated busbars are flat structures being designed as a stack of conducting layers and insulating material, whereas a sheet, layer or plate made of this of insulating material is sandwiched between two conducting layers.

The up to date approach for manufacturing a laminated busbar is based on joining separate layers of copper sheet conductors and composite insulating plates by glue bonding.

This technique of manufacturing requires several steps of surface treatment before applying the adhesive. Further those steps increase the costs and complexity of the process of manufacturing. Additionally the gluing process needs to be precisely controlled.

SUMMARY

In an embodiment, the present invention provides a laminated busbar, comprising: a base body comprising conducting layers and insulating material to electrically insulate the conducting layers from each other, wherein the conducting layers and the insulating material are clamped together by mechanical means and/or a profile is connected to the base body.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention ensures a simple producing of laminated busbars.

In an embodiment, the conducting layers and the insulating material are clamped together by mechanical means and/or a profile is connected to the base body.

According to the invention, mechanical clamping of a laminated busbar simplifies the assembly process and therefore reduces the costs of manufacturing. Mechanical clamping of the laminated busbar components can be achieved in several ways. No glue is needed and steps of surface treatment of conducting layers are not necessary.

Further, the components of the busbar can be stacked on clamping profiles that act as a template of assembly and allow a precise positioning of components.

Advantageously no glue or adhesive is arranged between at least one conducting layer and at least one insulating material. Conducting layers and insulating materials are joint together by a type of mechanical clamping in place of glue bonding between the separate layers and materials. Through this more accurately defined sheets or layers of insulating material can be arranged between the conducting layers.

Especially evenly arranged sheets or layers of insulating material can be arranged between the conducting layers. The sheets or layers of insulating material have an even thickness over their whole extension.

Further advantageously at least one conducting layer is connected to another conducting layer and/or to an insulating material by riveting or bolting, so that the rivets or bolts are the mechanical means. Rivets or bolts are very stable and solid. Nonconducting rivets or bolts can be used to prevent short circuits between two conducting layers.

Advantageously at least one insulating material is connected to another insulating material and/or to a conducting layer by riveting or bolting, so that the rivets or bolts are the mechanical means. Rivets or bolts are very stable and solid. Insofar the clamping action may be achieved by joining the layers together by direct bolting or riveting. Nonconducting rivets or bolts can be used to prevent short circuits between two conducting layers.

The bolts can be developed as stud bolts. Through this the conducting layers and the insulating material can be clamped together by screwing screw nuts with the bolts.

Further advantageously the mechanical means comprise at least one spring. Spring elements can be utilized in the clamping arrangements to compensate the thermal expansion or to create a floating type busbar structure.

Advantageously the mechanical means comprise at least one profile. Through this, the clamping can be done by one profile or by more profiles.

Further advantageously at least one insulating material between two conducting layers is developed as a plate. Plates can be handled as separate parts. Insulating material does not have to be casted in the process of manufacturing.

Advantageously the base body is formed like a wall and is flat. The busbar can be used as a wall of a cabinet or section. A cabinet or section may comprise a housing, whereas the housing comprises at least a rear side. Advantageously the housing comprises a laminated busbar as mentioned above, which is arranged on the rear side of the cabinet or section and/or forms at least a part of a back wall of the housing. Thereby a cabinet or section can be covered by a laminated busbar.

Further, advantageously the housing comprises a back wall, which covers the laminated bus bar. Hereby the laminated bus bar is protected from unauthorized access.

Advantageously the cabinet or section is a switchgear cabinet or section or is a low voltage switchgear cabinet or section. The cabinet or section advantageously comprises at least one module, especially a withdrawable module.

Further advantageously at least one profile is connected to an outer conducting layer in an electrically insulated manner or to an outer insulating material. One or more profiles can be used as a clamping means. Further, a dedicated profile arrangement can be used as the clamp member, which additionally creates the assembly template and laminated busbar installation frame. No additional reinforcement of the clamped structure shall be required. Resin casting of power distribution pin cutouts can be utilized to improve the joint but the mechanical stability of the structure shall relay on the clamping action.

Advantageously the base body is connected to at least one profile by riveting or bolting. This can be done in several ways. The clamping action may be achieved by bolting one conducting layer or more conducting layers and/or one insulating material or more insulating materials separately or together directly to a dedicated profile arrangement that creates a laminated busbar installation frame assembly.

Further, advantageously the profile is developed as a G-profile. G-profiles are very solid and are commercially available. The industrial norm EN 60715 describes G-profiles.

Advantageously an arrangement comprises a laminated busbar as described here and at least one profile or several profiles. The profile or the profiles act as assembly frame for other parts, which have to be connected to the laminated busbar.

Further advantageously at least a component of a cabinet or a switchgear is connected to at least one profile. Through this, a low voltage switchgear comprises such an arrangement and can be assembled in a simple manner.

Advantageously at least a compartment or plate of compartment is connected to at least one profile. The profiles can function as a template to arrange the compartments in the correct way.

Figure 1:
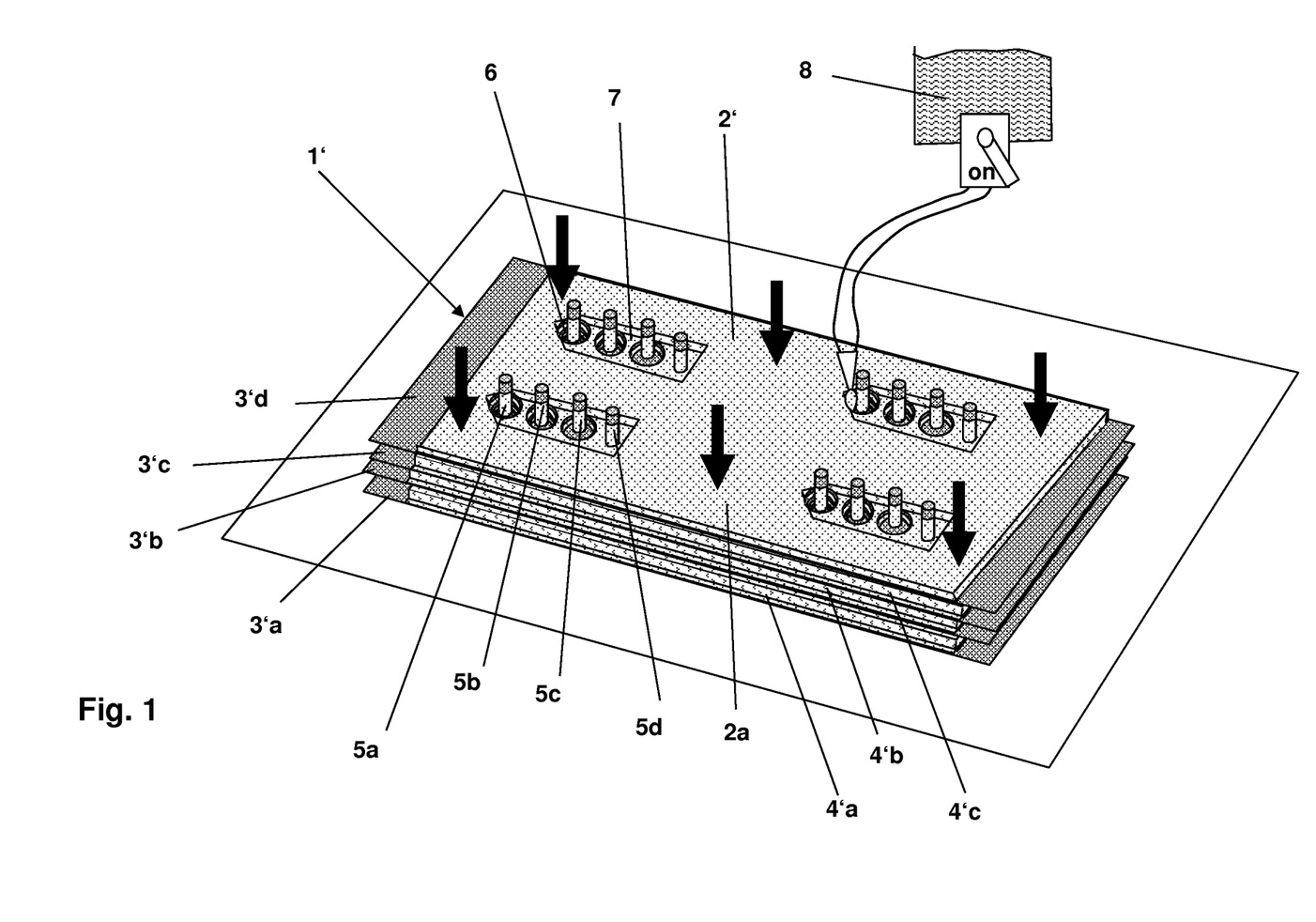
FIG. 1 shows an example of a laminated busbar and schematically one possible method to produce such a laminated busbar.

FIG. 1 shows a laminated busbar 1', comprising a flat base body 2' composed of conducting layers 3'a-d and insulating materials 4'a-c to electrically insulate the conducting layers 3'a-d from each other, whereas at least one conducting layer 3'a-d has at least one pin 5a-d to allow an electrical contact between the conducting layer and a device.

FIG. 1 shows an example of a laminated busbar 1'. FIG. 1 also shows schematically one possible method to produce such a laminated busbar 1'. Each conducting layer 3'a-d has four pins 5a-d. Some of the conducting layers 3'a-d and some of the insulating materials comprise spaces 6 or cavities 7 to allow a reach-through of a pin 5a-d. Further, the spaces 6 or cavities 7 can be filled with a resin 8 to fix or mechanically connect conducting layers 3'a-d and the insulating materials 4'a-c.

Each conducting layer 3'a-d is a flat sheet and is current carrying. Electrical current can be introduced by a pin 5a-d, which is electrically connected with its associated conducting layer 3'a-d. For example pin 5d is associated with conducting layer 3'd.

It is also possible that the pins 5a-d are partially coated with a resin. Modules can be contacted to the pins 5a-d.

According to the invention described here coated and non-coated conducting layers 3a-d, especially copper plates, can be used. The clamping method described here is applicable for coated and non-coated conducting layers 3a-d. In the following FIG. 2 non-coated conducting layers 3a-d are shown as an example.

Figure 2:
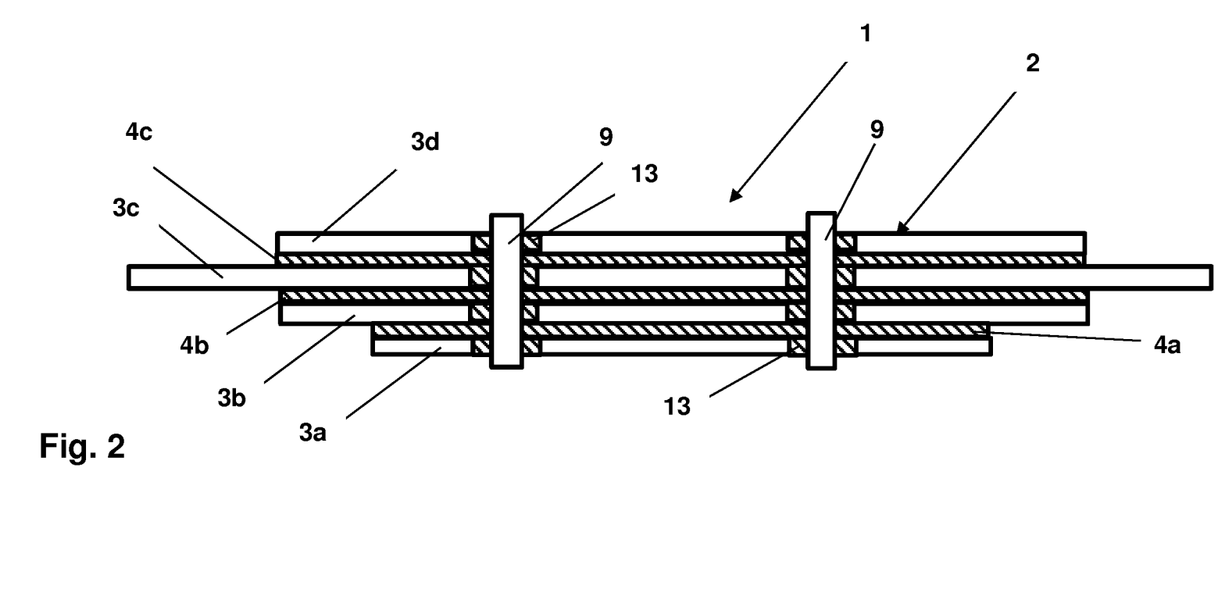
FIG. 2 shows an example of a laminated busbar whereas the conducting layers and the insulating materials are clamped together by mechanical means.

FIG. 2 shows a laminated busbar 1, comprising a base body 2 comprising conducting layers 3a-d and insulating material 4a-c to electrically insulate the conducting layers 3a-d from each other. The conducting layers 3a-d and the insulating material 4a-c are clamped together by mechanical means.

At least one conducting layer 3a-d is connected to another conducting layer 3a-d and to at least an insulating material 4a-c by bolting, so that the bolts 9 are the mechanical means. Also at least one insulating material 4a-c is connected to another insulating material 4a-c and to at least a conducting layer 3a-d by bolting, so that the bolts 9 are the mechanical means.

The complete sandwich is clamped by the bolts 9, not the conductive layers 3a-d or insulating material 4a-c separately.

There is a polymeric ring 13 that is used to ensure a certain distance between the bolt 9 and each conducting layer 3a-d. This ring 13 can also be part of the insulating material 4a-c, namely a plate, directly. This ring 13 can also be part of the conducting layer 3a-d directly, but has to be made of an electrically insulating substance. In FIG. 2 there are shown four polymeric rings 13 as an example.

No glue or adhesive is arranged between at least one conducting layer 3a-d and at least one insulating material 4a-c. Each insulating material 4a-c between two conducting layers 3a-d is developed as a plate. The base body 2 is formed like a wall and is flat. The pins 5a-d of FIG. 1 may be arranged also in the laminated busbar 1 of FIG. 2 for the same reasons as explained above.

It is also possible that the pins 5a-d are partially coated with a resin. According to the invention described here coated and non-coated conducting layers 3a-d, especially copper plates, can be used. The clamping method described here is applicable for coated and non-coated conducting layers 3a-d.

The conducting layers 3a-d are preferably made of copper, but can also be made of aluminum. The insulating material 4a-c is preferably made of a polymer based insulation, but also ceramic or mineral based material could be used.

Figure 2A:
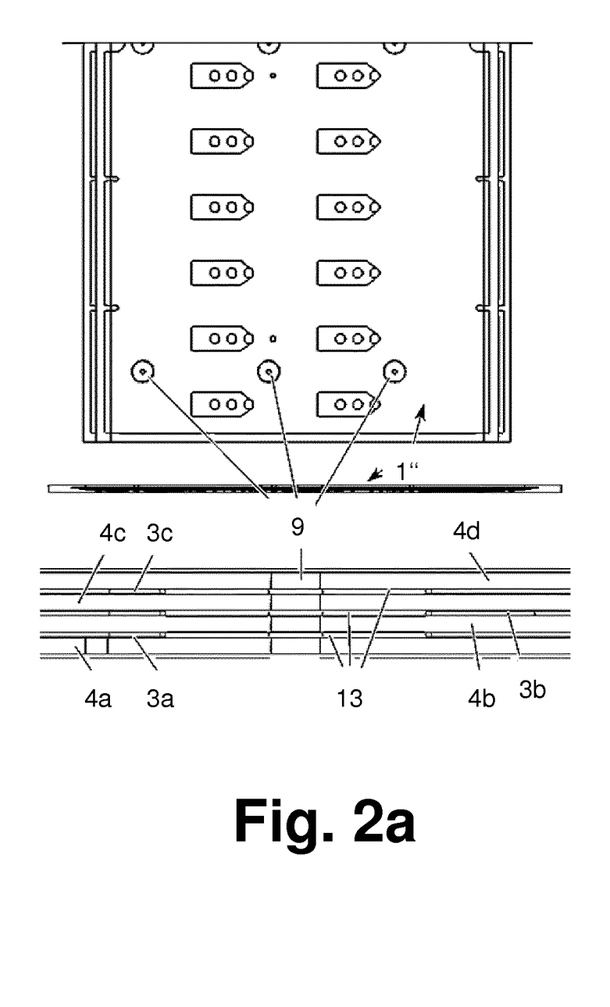
FIG. 2a shows at the top a front view of a further laminated busbar, in the middle a side view and at the bottom a sectional view of the busbar.

FIG. 2a shows a busbar 1". FIG. 2a additionally shows that another complete sandwich of three conducting layers 3a-c made of copper and four plates of insulating material 4a-d is clamped by a bolt 9. In addition there are insulation rings 13 around the bolt 9 in the holes of the copper sheets.

Figure 2B:
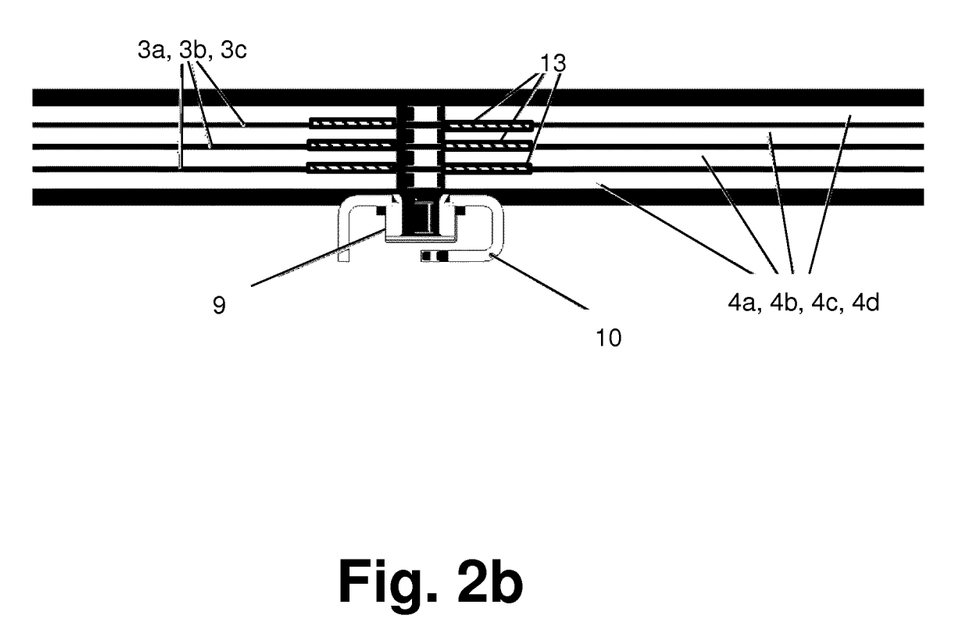
FIG. 2b shows a sectional view of the busbar of FIG. 2a which is fixed to at least one G-profile.

FIG. 2b additionally schematically shows the another complete sandwich of the busbar 1" of FIG. 2a which is clamped by at least one bolt 9 to a profile 10, namely a G-profile. There can be used nine bolts 9 and 9 screws to fix the profile 10 to the sandwich.

Figure 3:
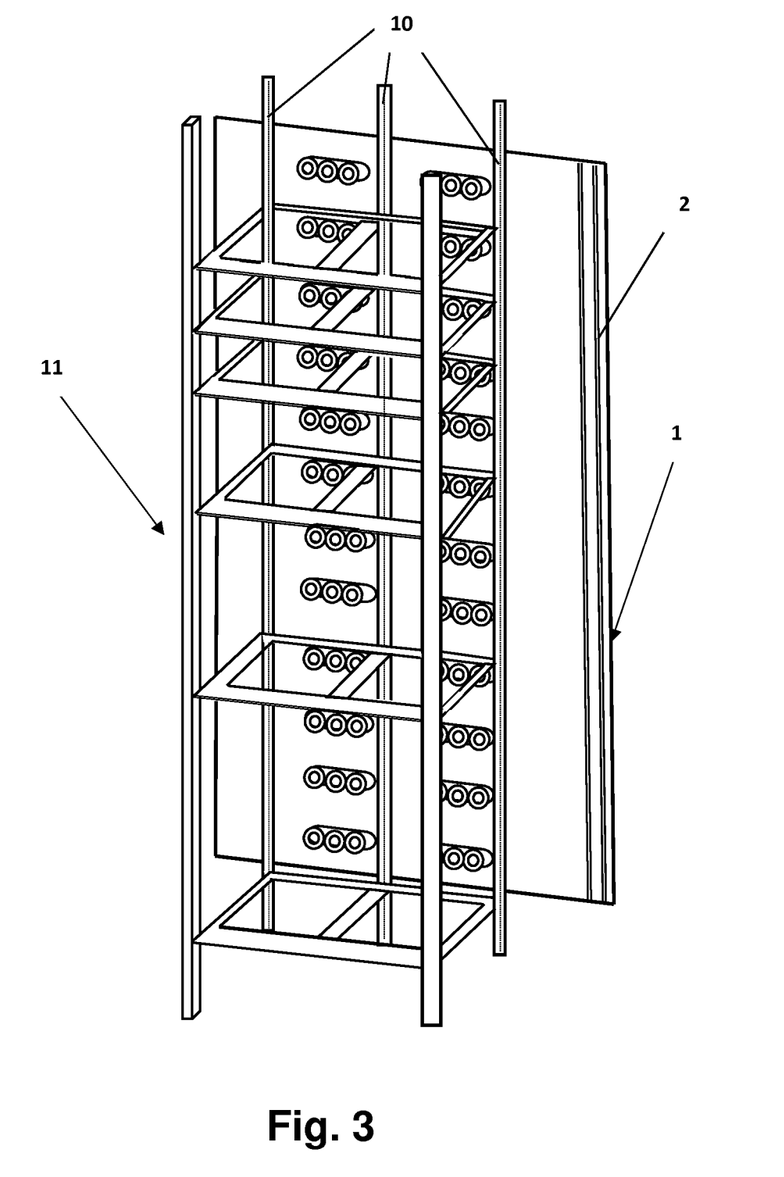
FIG. 3 shows a perspective view of plates of compartments fixed on the G-profiles, whereas the G-profiles are connected to the base body of the laminated busbar.

FIG. 3 shows that three profiles 10 are connected to the base body 2 of the laminated busbar 1 according to FIG. 2. The profiles 10 are connected to an outer insulating material, which is not shown in FIG. 2, to protect personal from electrical current. The base body 2 may be connected to at least one profile 10 by riveting or bolting.

The profile 10 is a metallic profile with a plurality of holes in it, namely a so called G-profile. The profile 10 is used to mount the sandwich, namely the base body 2 of the busbar 1, to it. This can be done by means of a bolt 9 which extends through the openings of the associated rings 13.

FIG. 3 insofar shows an arrangement 11, comprising a laminated busbar 1 as described above and several profiles 10. The profiles 10 are developed as G-profiles.

Figure 4:
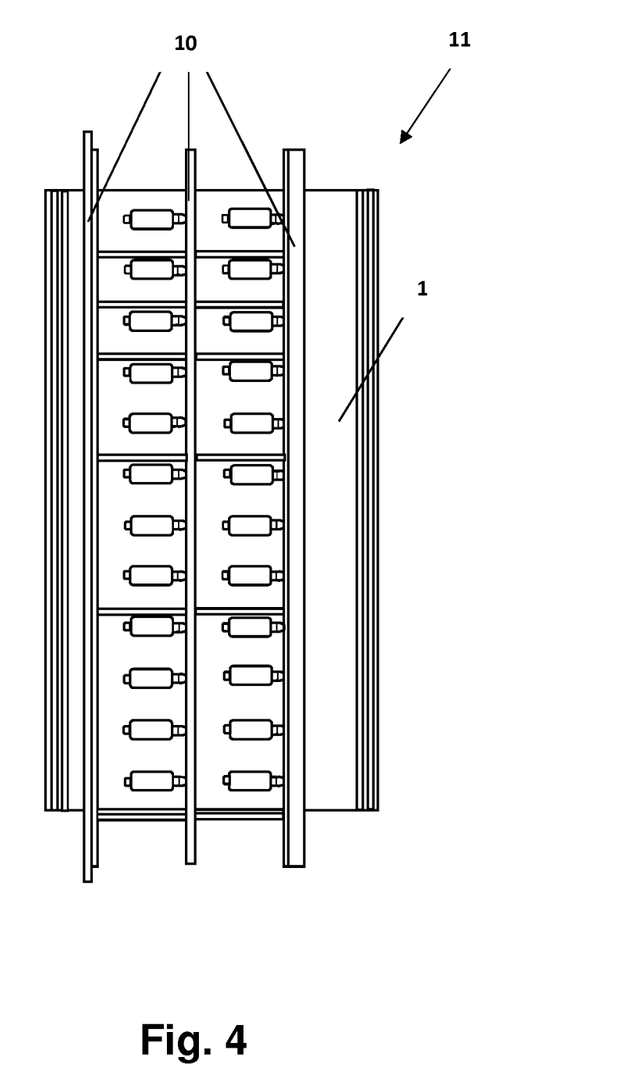
FIG. 4 shows a combination of G-profiles functionality for laminated busbar mechanical clamping and fixation of switchgear parts, e.g. compartments and shutters.

FIG. 4 shows a combination of G-profiles functionality for laminated busbar mechanical clamping and fixation of switchgear parts, e.g. compartments and shutters. Insofar FIG. 4 shows an arrangement 11 wherein at least a component of a cabinet or a switchgear is connected to at least one profile 10. Especially a low voltage switchgear comprises such a laminated busbar 1 or such an arrangement 11.

Figure 5:
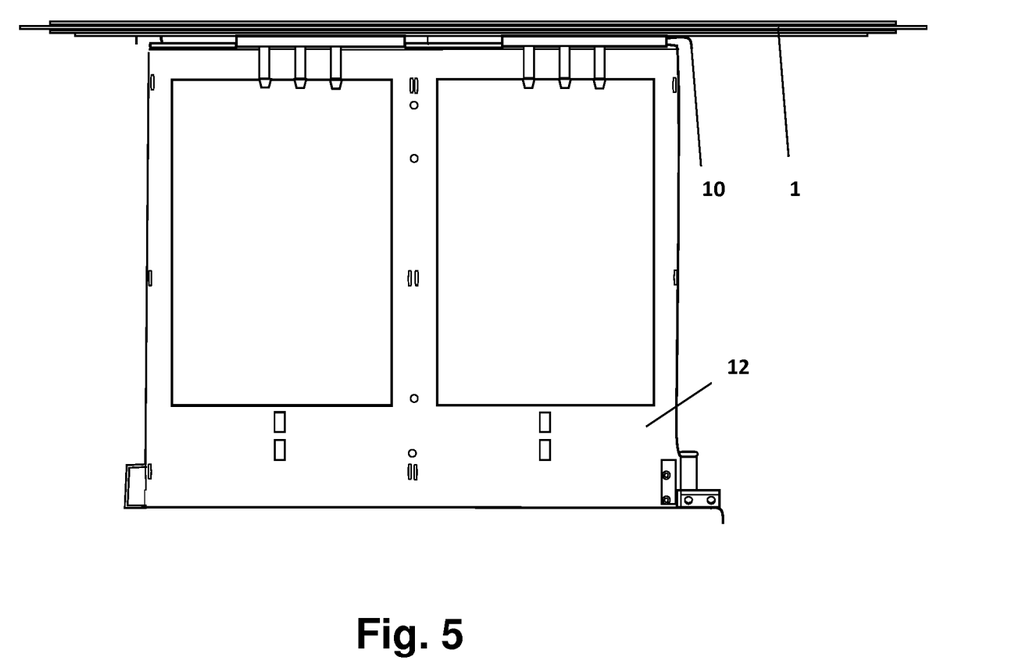
FIG. 5 shows schematically a compartment fixation.

FIG. 5 shows schematically a fixation of a compartment 12 to the profiles 10. Insofar FIG. 5 shows that at least a compartment 12 is connected to at least one profile 10. The compartment 12 comprises a plate, which is connected to at least one profile 10.

Figure 6:
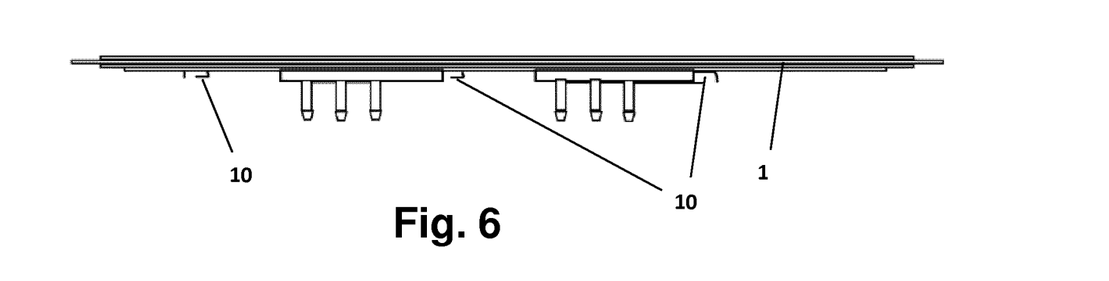
FIG. 6 shows a top view of the laminated busbar of FIG. 5, which is connected to G-profiles.

FIG. 6 shows a top view of the laminated busbar 1 of FIG. 5.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

| Reference numbers | |
|---|---|
| 1, 1', 1" | Laminated busbar |
| 2, 2' | Base body |
| 3', 3a-d | Conducting layer |
| 4', 4a-d | Insulating material |
| 5a-d | Pin |
| 6 | Space |
| 7 | Cavity |

| Reference numbers | |
|---|---|
| 8 | Resin |
| 9 | Bolt |
| 10 | Profile |
| 11 | The arrangement |
| 12 | Compartment |
| 13 | Ring |

What is claimed is:

1. A laminated busbar, comprising:
   a base body comprising conducting layers and insulating material to electrically insulate the conducting layers from each other,
   wherein the conducting layers and the insulating material are clamped together by mechanical means,
   wherein a profile is connected to the base body,
   wherein insulation rings are disposed around the mechanical means in holes of the conducting layers, and
   wherein the base body is connected to the profile by riveting or bolting.

2. The laminated busbar according to claim 1, wherein no glue or adhesive is arranged between at least one conducting layer and at least one insulating material.

3. The laminated busbar according to claim 1, wherein at least one conducting layer is connected to another conducting layer and to an insulating material by riveting or bolting, so that the rivets or bolts are the mechanical means.

4. The laminated busbar according to claim 1, wherein at least one insulating material is connected to another insulating material and to a conducting layer by riveting or bolting, so that the rivets or bolts are the mechanical means.

5. The laminated busbar according to claim 1, wherein at least one insulating material between two conducting layers comprises a plate.

6. The laminated busbar according to claim 1, wherein the base body comprises a wall and is flat.

7. The laminated busbar according to claim 1, wherein at least one profile is connected to an outer conducting layer in an electrically insulated manner or to an outer insulating material.

8. The laminated busbar according to claim 1, wherein the profile comprises a G-profile.

9. An arrangement, comprising:
   the laminated busbar according to claim 1; and
   at least one profile or several profiles.

10. The arrangement according to claim 9, wherein at least a component of a cabinet or a switchgear is connected to at least one profile.

11. The arrangement according to claim 9, wherein at least a compartment or plate of a compartment is connected to at least one profile.

12. A switchgear, comprising:
   the laminated busbar according to claim 1.

13. The switchgear according to claim 12, wherein the switchgear comprises a low voltage switchgear.

14. A switchgear, comprising:
   the arrangement according to claim 9.

15. The switchgear according to claim 14, wherein the switchgear comprises a low voltage switchgear.

* * * * *